United States Patent [19]

Uetama et al.

[11] Patent Number: 5,493,421
[45] Date of Patent: Feb. 20, 1996

[54] FACSIMILE APPARATUS

[75] Inventors: Eiji Uetama, Yamatokoriyama; Masayuki Hachinoda, Nara, both of Japan

[73] Assignee: Sharp Kabushiki Kaisha, Osaka, Japan

[21] Appl. No.: 93,335

[22] Filed: Jul. 16, 1993

[30]    Foreign Application Priority Data

Jul. 17, 1992 [JP] Japan ................................. 4-191000

[51] Int. Cl.⁶ ..................................................... H04N 1/32
[52] U.S. Cl. ........................ 358/468; 358/401; 358/434; 358/448; 358/296
[58] Field of Search .................................. 358/468, 486, 358/434, 438, 444, 448, 296, 401, 501

[56]            References Cited

U.S. PATENT DOCUMENTS

| | | | |
|---|---|---|---|
| 4,228,469 | 10/1980 | Ford, Jr. ............................. | 358/486 |
| 4,356,516 | 10/1982 | Koguchi ............................. | 358/486 |
| 4,549,221 | 10/1985 | Yamamoto et al. ................ | 358/486 |

FOREIGN PATENT DOCUMENTS

| | | |
|---|---|---|
| 237155 | 12/1989 | Japan . |
| 3-171971 | 7/1991 | Japan . |
| 3-171974 | 7/1991 | Japan . |
| 3-195176 | 8/1991 | Japan . |
| 213361 | 12/1991 | Japan . |
| 230511 | 12/1992 | Japan . |
| 2231247 | 7/1990 | United Kingdom . |

OTHER PUBLICATIONS

Patent Abstracts of Japan, vol. 14, No. 108, (E–896) Feb. 27, 1990.
Patent Abstracts of Japan, vol. 14, No. 507, (E–998) Nov. 6, 1990.
European Search Report, *The Hague*, completed Oct. 26, 1993.

*Primary Examiner*—Edward L. Coles, Sr.
*Assistant Examiner*—Fan Lee
*Attorney, Agent, or Firm*—Nixon & Vanderhye

[57]            ABSTRACT

A facsimile apparatus capable of conserving the recording paper and using a limited amount of the recording paper effectively is disclosed. In the case where what is called the total blank line data with the entire line representing blank (data zero) data at the time of receiving are successively received are received successively, the subsequent successively-received total blank line data are not printed by the recorder on the recording paper. The recording paper is thus printed omitting the unrequited marginal portion, and therefore a limited amount of recording paper is used effectively without adversely affecting the effective image data.

7 Claims, 3 Drawing Sheets

FACSIMILE APPARATUS

BACKGROUND OF THE INVENTION

1. Field of the Invention

The present invention relates to a facsimile apparatus capable of economizing the recording paper.

2. Description of the Related Art

FIG. 4 is a flowchart/or explaining the printing operation for a conventional facsimile apparatus. After image data has been received in step a1, in step a2, the MH (Modified Huffman) decoding operation is executed. Then, in step a3, it is decided whether a one-line data is the total blank line data or not. The total blank line data is defined as image data in which 1 line of the original along the direction of main scanning of the reading means is totally blank (0).

In the case where step a3 decides that the line data is not the total blank line data, the process proceeds to step a4 for printing the particular line data, after which the process is passed to step a7.

In the case where step a3 decides that the one-line data is the total blank line data, the process proceeds to step a5 which decides whether more than a predetermined number of lines are total blank. In the case where the decision is negative, the process proceeds to step a4 for performing the printing operation. When the decision is affirmative, on the other hand, the process is passed to step a6, where the total blank printing is effected. The total blank printing is defined as the feed of the recording paper over the number of total blank lines without printing.

In step a7, it is decided whether the printing of the image data for one page has been completed. In the case where the printing has not been completed, the process is returned to step a1 for receiving the next image data. When the printing has been completed, on the other hand, the process comes to end.

As described above, conventional facsimile apparatuses, in which primary emphasis is placed on the printing of the transmitted image data accurately on the recording paper, have not any function of printing the image data by compression omitting the unrequired portion. Although the conventional apparatuses decide whether the data to be printed is total blank line data, the detection is used for setting the period of the printing operation.

The result is that such portions as not much required including a margin of the original are also printed as it is, often wasting the recording paper. Also, a sheet of the recording paper printed with the image data is often longitudinal and is difficult to handle.

The recording paper including the thermosensitive paper is the only supply in the operation of the facsimile apparatus. The 30-m paper roll in general use permits the printing of about one hundred sheets of A4-size (210 mm× 297 mm) original. If the number of pages to be printed is to be increased, the paper roll may be lengthened. A longer paper roll, however, would make it necessary to proportionately increase the size of the facsimile apparatus.

SUMMARY OF THE INVENTION

The object of the invention is to provide a facsimile apparatus which economizes the recording paper and is capable of using a limited amount of recording paper effectively.

The invention is a facsimile apparatus which comprises means connected with the public telephone network for receiving image data including a plurality of line data, print control means for outputting image data divided by line data having a plurality of dot data in response to the output of the receiving means, and means for printing the recording data in the form of printed recording paper in response to the output of the printing control means, wherein in the case where the blank line data with blank dots for the entire line continues over a predetermined number of lines, subsequent blank line data are omitted from the output.

According to the invention, upon receipt by the receiving means of image data including a plurality of line data, the printing control means divides the received data by each line data having a plurality of dot data and outputs the image data to the printing means. The printing means prints the image data of each line data on the recording paper. In the process, in the case where a predetermined number of blank line data with the entire line in white dots are received successively, the printing control means produces an output omitting the subsequent blank line data. As a result, the unrequired data portion such as the margins of the original is omitted in printing.

As described above, according to the invention, in the case where a predetermined number of blank line data with the entire line blank are successively received, the subsequent blank line data are omitted in output, thereby making it possible to print the original while omitting the unrequired data portion such as the margins thereof. As a result, the consumption of the recording paper is reduced, the wasteful use of the recording paper is prevented, and a limited amount of recording paper thus is used effectively. Also, as compared with the prior art, the number of sheets than can be printed is increased, thereby reducing the cost of the recording paper. Further, the printing result of the originals containing considerable margins is stored in a smaller space than in the prior art, thereby providing the convenience for both handling and storage.

According to the invention, the printing control means comprises a first counter for counting the number of black-dot ones of a plurality of dot data constituting a one-line data, a second counter for incrementing one when the count of the first counter is zero, the second counter being reset to the initial value of zero when the count of the first counter is not zero, and a comparator for comparing the count on the first counter with a predetermined reference value.

BRIEF DESCRIPTION OF THE DRAWINGS

Other and further objects, features, and advantages of the invention will be more explicit from the following detailed description taken with reference to the drawings wherein.

DETAILED DESCRIPTION OF THE INVENTION

Figure 1:
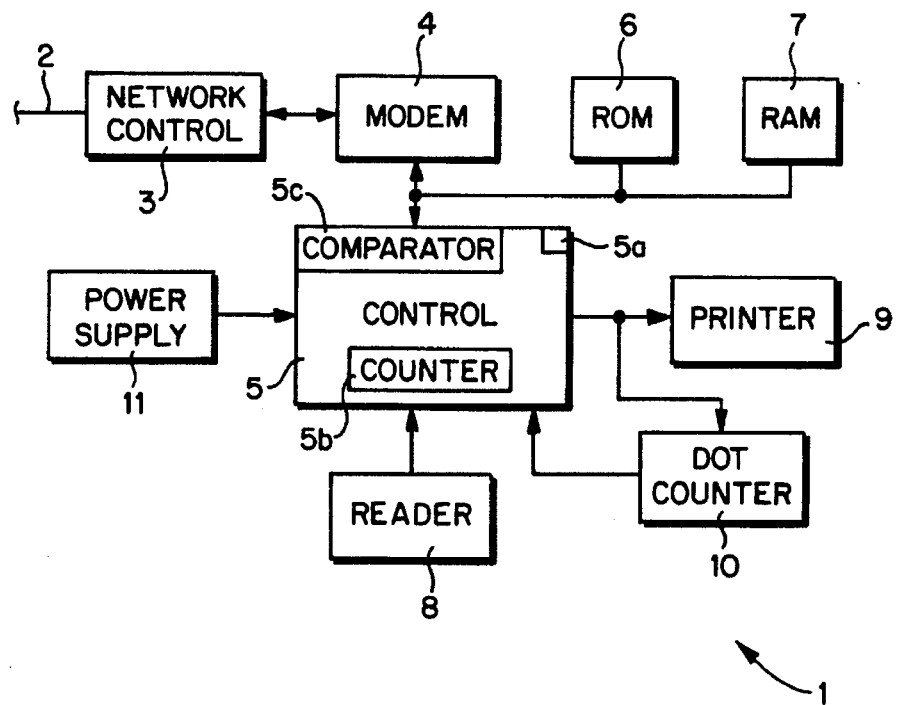
FIG. 1 is a block diagram schematically showing the configuration of a facsimile apparatus 1 according to an embodiment of the invention.

Now referring to the drawing, preferred embodiments of the invention are described below.

FIG. 1 is a block diagram showing a schematic configuration of a facsimile apparatus 1 according to an embodiment of the invention. The facsimile apparatus 1 is connected to a public telephone network 2 for transmitting and receiving image data. The public telephone network 2 is connected to a network control circuit 3. The network control circuit 3 accomplishes such operations as the detection of an incoming call, make/break of the network and call. The received facsimile signal is applied to a modem 4, and the facsimile signal to be transmitted from the modem 4 is sent out to the public telephone network 2.

The modem 4 demodulates and applies the received facsimile signal to a control circuit 5, and the facsimile signal supplied from the control circuit 5 for transmission is modulated and applied to the network control circuit 3. The control circuit 5 is realized by a central processing unit (CPU) or the like. On the basis of various operation programs stored in a read-only memory (ROM) 6, various operations including the reading of the original, and transmission, receiving and printing of image data are controlled. The working area used for running the operation program, the image data storage area for storing the image data, etc. are set in a random-access memory (RAM) 7. Also, the control circuit 5 includes a flag region 5a for storing the total blank flag described later, a successive total blank counter 5b for counting the number of total blank lines and a comparator 5c for comparing the count of the counter 5b with a predetermined reference value.

A reader 8 includes a photoelectric converter such as a CCD (charge-coupled device) which irradiates the light from a light source on the surface of the original, converts the reflected light into an electrical signal, and applies the electrical signal to the control circuit 5. This electrical signal is binarized or otherwise processed, and transmitted by being converted into image data. A printer 9 is realized by such a device as the thermal printer for printing the received image data as an output on the recording paper such as thermosensitive recording paper. The image data outputted from the control circuit 5 is applied also to a dot counter 10 for counting the number of printed dots in each line as described later. The facsimile apparatus 1 is supplied with the driving power by a power supply 11.

Figure 2:
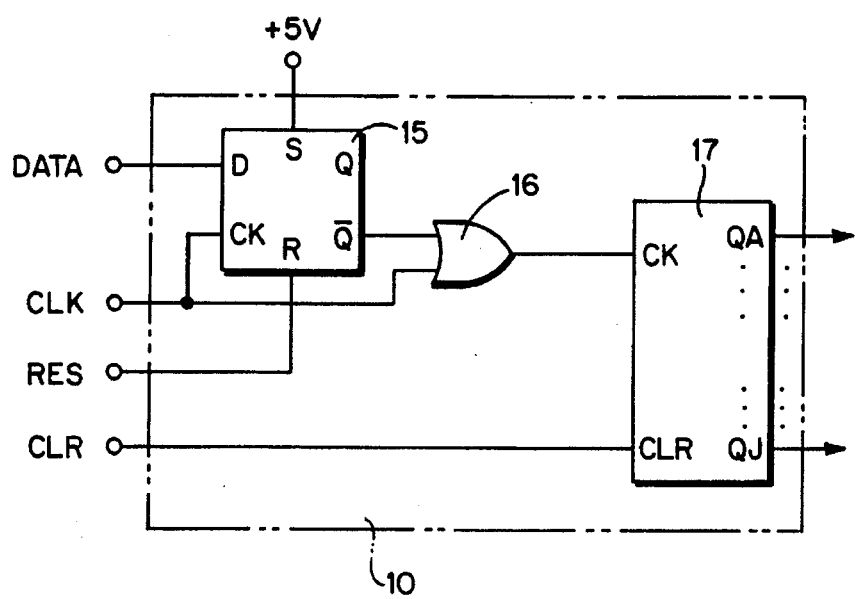
FIG. 2 is a circuit diagram showing a specific example of the configuration of a dot counter 10 included in the facsimile apparatus 1.

A circuit diagram of a specific configuration of the dot counter 10 is shown in FIG. 2. The dot counter 10 includes a D flip-flop 15, an OR (logic addition) circuit 16 and a counter 17. The D input of the D flip-flop 15 is supplied with image data (line data) DATA including a plurality of dot data from the control circuit 5, the CK input thereof with a clock signal CLK for defining the output timing of the dot data, the R input thereof with a reset signal RES, and the S input thereof with an operating voltage of +5 V from a power supply 11. One input of the OR circuit 16 is supplied with an inverted input of the Q output of the D flip-flop 15, and the other input thereof with a clock signal CLK. The output of the OR circuit 16 is applied to the CK input of the counter 17, and the outputs QA to QJ to the control circuit 5. The counter 17 is initialized by a clear signal CLR. The reset signal RES and the clear signal CLR are outputted each time a one-line signal is supplied.

Figure 3:
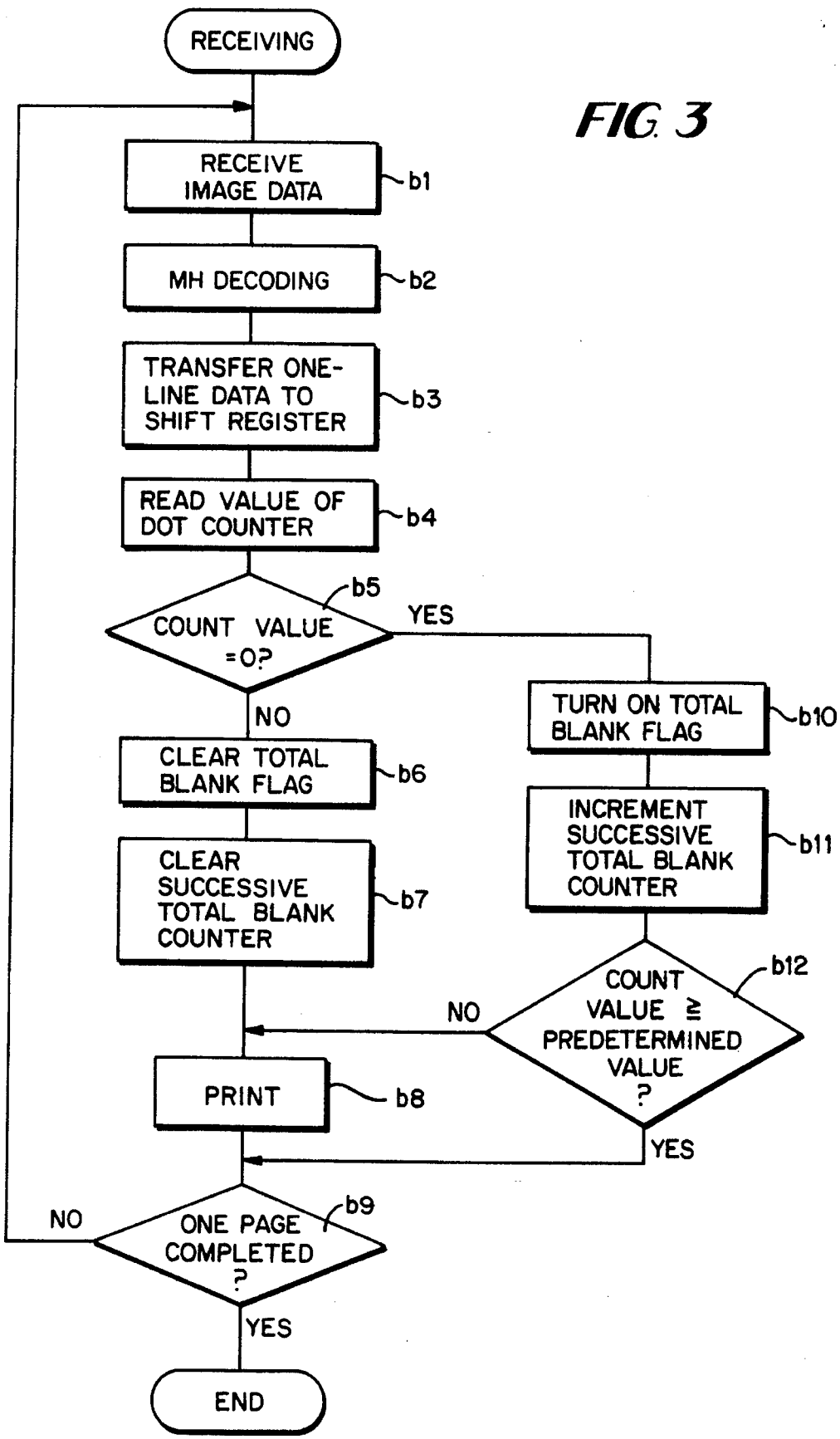
FIG. 3 is a flowchart for explaining the receiving operation of the facsimile apparatus 1.
Figure 4:
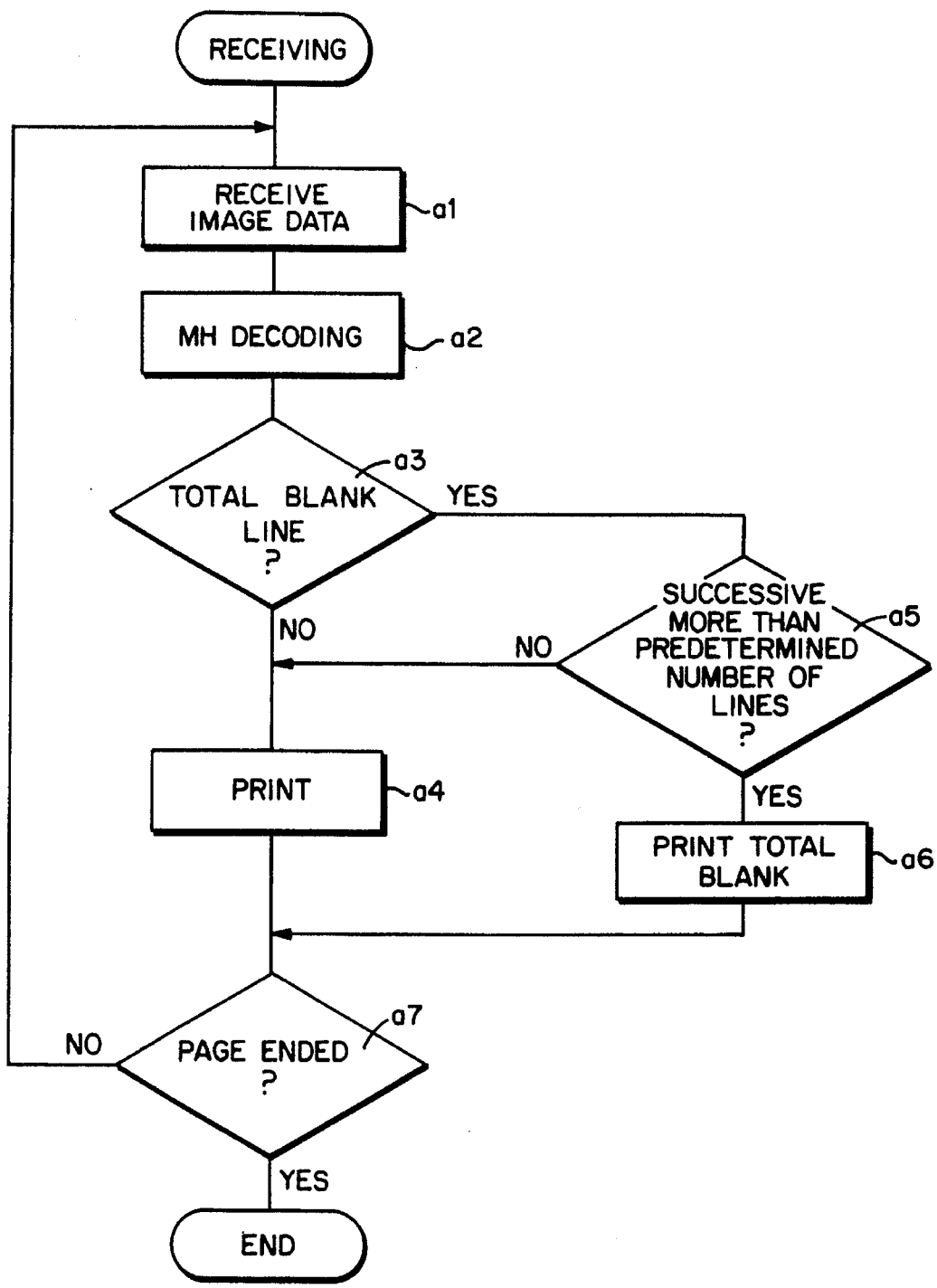
FIG. 4 is a flowchart for explaining the receiving operation of a conventional facsimile apparatus.

FIG. 3 is a flowchart showing the receiving operation of the facsimile apparatus 1. When the image data is received through the network control circuit 3 and the modem in step b1, in step b2, the control circuit 5 performs MH decoding, followed in step b3 the one-line data is transferred to the shift register in the control circuit 5.

Then, in step b4, the control circuit 5 reads the count of the dot counter 10, and in step b5, it is decided whether the count is zero or not. In the case where the count is not zero, the process is passed to step b6 for clearing the total blank flag stored in the control circuit 5, followed by step b7 for clearing the count of the successive total blank counter 5b set in the control circuit 5.

After that, in step b8, the printer 9 prints a given one-line data on the recording paper, and the process proceeds to step b9. In step b9, it is decided whether a page of image data has been received or not. In the case where the receiving has not been completed, the process returns to step b1 for receiving the next image data, while when it is decided that the receiving is complete, the process is ended.

In the case where the count is zero at step b5, the process proceeds to step b10 thereby to turn on (1) the total blank flag stored in the control circuit 5. Then, in step b11, the count of the successive total blank counter 5b is increased by one, and in step b12, it is decided whether the count is more than a predetermined value. In the case where the count of the successive total blank counter 5b is more than a predetermined value, the printing operation is omitted and the process proceeds to step b9. In the case where the count of the successive total blank counter 5b is less than a predetermined value, on the other hand, the process is passed to step b8 for executing the printing operation.

As explained above, according to this embodiment, in the case where a given line of the received image data is blank (0) in its entirety, i.e., in the case where a predetermined number of lines of total blank line data is received successively, subsequently successive total blank line data are not printed but what is called the marginal portion is printed by compression. As a consequence, the unrequired marginal portion in the original is deleted for printing, thereby conserving the amount of recording paper consumption.

For this reason, the cost of the recording paper is reduced, thereby leading to an economical advantage. Also, the printing on the recording paper omitting the unrequired marginal portion makes it possible to print the effective image data in ordinary fashion while at the same time shortening the length of the recording paper required for printing. As a result, the recording paper of a necessary minimum length is used, thereby offering the convenience of storage of the recording paper.

The invention may be embodied in other specific forms without departing form the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A facsimile apparatus comprising:

means connected to a public telephone network for receiving image data containing a plurality of line data;

printing control means for outputting to a printing means said plurality of line data containing a plurality of dot data; and said printing means for printing the plurality line data on a recording paper and for advancing the recording paper through the printing means, wherein when a predetermined number of blank line data represented by blank dots for an entire line is output successively by the printing control means, said printing control means omits outputting blank line data and stops advancing the recording paper subsequent and successive to the predetermined number of blank line data, until dot data is next processed by the printing control means.

2. The facsimile apparatus according to claim 1, wherein said printing control means comprises:

a first counter for counting the number of image dots in the dot data in each line of said line data:

a second counter for incrementing by one when the count for each line in the first counter is zero, said second counter being reset to an initial value when the count for each line in the first counter is not zero; and a comparator for comparing the count of the second counter with a predetermined reference value.

3. A method for printing a received facsimile transmission using a facsimile device coupled to a public telephone network, a network interface, a printer controller, and a printer, said method comprising the steps of:

a. receiving a facsimile transmission containing image data at the facsimile device via the network interface and conveying the image data to the printer controller;

b. outputting successive lines of the image data from the printer controller to the printer;

c. detecting image dots in successive lines of image data and counting the number of successive blank lines of image data having no image dots;

d. printing each successive line of image data and blank lines on recording paper, if the cumulative count of successive blank lines is less than a predetermined blank line number, e. advancing the recording paper in the printer after printing each successive line of image data and blank lines, and f. not printing each successive blank line of image data and not advancing the recording paper, when the count of successive blank lines is equal to or greater than said predetermined blank line number.

4. A method as stated in claim 3 wherein in step (c) the detection of image dots is performed by counting the number of image dots in each successive line of image data and storing the number of dots in a dot counter coupled to the printer controller.

5. A method as stated in claim 3 wherein in step (c) the count of successive blank lines is cumulated in a blank line counter in the printer controller and the blank line counter is incremented for each successive blank line.

6. A method as in claim 5 wherein in step (c) the blank line counter is reset to an initial state for each successive line having an image dot.

7. A facsimile device receiving facsimile transmissions of image data from a public telephone network, the facsimile device comprising:

a printer controller having a central processing means (CPU) for converting the image data into print lines of print data and said CPU operatively connected to a blank line detector, and a blank line memory storing a blank line count generated by the CPU, and said printer controller outputting to a printer successive print lines of print data representative of successive lines of image data received in the facsimile transmission;

wherein the printer controller activates a printer to print and advances a recording paper for each of the successive print lines of print data when tile blank line count is less than a predetermined number and tile printer controller inhibits the printing of print lines and advancement of recording paper when the blank line count is equal to or greater than said predetermined number, and wherein tile printer controller increments the blank line count each time a blank print line is detected by said blank line detector, and the printer controller resets the blank line count each time a print line is not blank, as determined by the blank line detector.

subsequent and successive to the predetermined number of blank line data.

* * * * *